United States Patent [19]
Yoshitake et al.

[11] Patent Number: 6,025,455
[45] Date of Patent: Feb. 15, 2000

[54] PROCESS OF PRODUCING HYDROPHOBIC ORGANOSILICA SOL

[75] Inventors: Keiko Yoshitake; Takafumi Yokoyama, both of Funabashi, Japan

[73] Assignee: Nissan Chemicals Industries, Ltd., Tokyo, Japan

[21] Appl. No.: 09/084,092

[22] Filed: May 26, 1998

[30] Foreign Application Priority Data

May 26, 1997 [JP] Japan ................................ 9-134833

[51] Int. Cl.$^7$ .................................................. C08G 77/00
[52] U.S. Cl. ........................... 528/10; 528/490; 252/309; 106/287.16; 106/287.12
[58] Field of Search ..................... 528/10, 490; 423/338; 252/309; 106/287.12, 287.16

[56] References Cited

U.S. PATENT DOCUMENTS

| | | |
|---|---|---|
| 2,433,776 | 12/1947 | Marshall . |
| 2,786,042 | 3/1957 | Iler . |
| 2,801,185 | 7/1957 | Iler . |
| 5,185,037 | 2/1993 | Kaijou ................ 106/287.12 |
| 5,651,921 | 7/1997 | Kaijou . |
| 5,856,379 | 1/1999 | Shiratsuchi et al. ................ 523/209 |

FOREIGN PATENT DOCUMENTS

| | | |
|---|---|---|
| 0 216 047 A1 | 4/1987 | European Pat. Off. . |
| 0 372 124 A1 | 6/1990 | European Pat. Off. . |
| 0 475 132 A1 | 3/1992 | European Pat. Off. . |
| 0 699 626 A1 | 3/1996 | European Pat. Off. . |
| 0 768 351 A1 | 4/1997 | European Pat. Off. . |
| 57-196717 | 12/1982 | Japan . |
| 58-145614 | 8/1983 | Japan . |
| 3-187913 | 8/1991 | Japan . |
| 4-108606 | 4/1992 | Japan . |
| 4-170313 | 6/1992 | Japan . |
| 6-92621 | 4/1994 | Japan . |
| 6-298519 | 10/1994 | Japan . |
| WO96/34063 | 10/1996 | WIPO . |

*Primary Examiner*—Melvyn I. Marquis
*Assistant Examiner*—Mark W. Milstead
*Attorney, Agent, or Firm*—Oliff & Berridge, PLC

[57] ABSTRACT

A process of producing a hydrophobic organosilica sol which comprises aging a reaction mixture at 0 to 100° C. in the state that an alkali present in the reaction mixture is removed or is neutralized with an acid in an equivalent amount or more, thereby forming a silylation-treated silica sol having a hydrophobic colloidal silica dispersed therein, the reaction mixture comprising: (a) a hydrophilic colloidal silica having a specific surface area of 5.5 to 550 m$^2$/g in SiO$_2$ concentration of 5 to 55% by weight, (b) a silylating agent of a disiloxane compound and/or monoalkoxysilane compound in a millimolar ratio of 0.03 to 2 in terms of Si atom per 100 m$^2$ of a surface of the hydrophilic colloidal silica, and (c) a medium, as a residue thereof, comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium.

9 Claims, No Drawings

PROCESS OF PRODUCING HYDROPHOBIC ORGANOSILICA SOL

BACKGROUND OF THE INVENTION

1. Field of the Invention

The present invention relates to a process of efficiently producing a hydrophobic organosilica sol comprising a colloidal silica stably dispersed in a hydrophobic organic solvent, a part of silanol groups on the surface of the silica particles being silylated. This process is useful for the production of a silica sol comprising a colloidal silica dispersed in ketones or esters.

2. Description of the Related Art

U.S. Pat. No. 2,433,776 discloses a technique of adding a water-soluble solvent to an aqueous silica sol containing an inorganic salt to salt out, extracting, and forming an organosilica sol. For example, Example 2 of this U.S. patent describes adding sulfuric acid to sodium silicate aqueous solution, adding n-propanol to the resulting mixture to separate an organic layer, dehydrating to a certain extent, removing a salt, and further dehydrating the organic layer, thereby obtaining propanol-dispersed sol. Example 6 of the U.S. patent also describes that the propanol sol can be substituted with butyl acetate.

U.S. Pat. No. 2,786,042 discloses a process of producing a hydrophobic silica sol having an average particle size of 10 to 150 nm in which silyl groups having 1 to 20 carbon atoms are bonded to at least 5% of surface Si atoms by reacting hydrocarbon-substituted silanol on the surface of particle. Halogen, alkoxy and sodium compounds are exemplified as a compound for forming hydrocarbon-substituted silanol. For example, an alkali siliconate aqueous solution is added to an aqueous silica sol, the resulting mixture is neutralized with formic acid, and t-butyl alcohol and sodium chloride are added to the neutralized mixture to salt out, thereby obtaining an aqueous organosilica sol.

U.S. Pat. No. 2,801,185 discloses a silica colloid redispersible in an organic solvent, which has an average particle size of 5 to 150 nm, is rendered hydrophobic with alcohol or organosilyl group chemically bonded to silica surface, and has hydroxyl group surface of 10 $m^2$ or less per 1 g as measured by methyl red adsorption method. For example, when dimethyl dichlorosilane is added to a silica sol having triethyl phosphate as a dispersion medium, and after reaction, hydrogen chloride (hydrochloric acid), a solvent, excess dimethyl dichlorosilane and the like are distilled off, a solid dispersible in benzene or chloroform is obtained.

JP-A-57-196717 describes that a silica powder having esterified surface thereof and dispersible in an organic solvent is obtained by heating a silica sol dispersed in an alcohol having 2 to 18 carbon atoms to 170 to 300° C., and then distilling off the alcohol. For example, silica powder redispersible in, for example, methyl ethyl ketone is obtained by heating ethyl alcohol silica sol to 200° C., and then removing a liquid phase.

JP-A-58-145614 describes that a silica powder redispersible in an organic solvent, having silyl groups having 1 to 36 carbon atoms bonded to a surface of colloidal silica particles in an amount of 1 to 100/10 $nm^2$ is obtained by adding a silylating agent to an organosilica sol having a water content of 10% or less to conduct reaction, and then distilling off the solvent. Chlorosilane compounds, alkoxysilane compounds, silazane compounds, hydroxysilane compounds and the like are exemplified as the silylating agent. It is described therein that the amount of bonded alkyl groups necessary for obtaining redispersibility varies depending on a carbon atom number of the silyl group, and when the carbon atom number is 3, the amount is 25/10 $nm^2$ or more. For example, trimethylchlorosilane is added to n-butyl alcohol silica sol to conduct reaction, and the resulting reaction mixture is dried under reduced pressure to obtain hydrophobic silica powder. This powder has bonded silyl groups of 32.8 per 10 $nm^2$, and when a dispersion having 10 g of this powder dispersed in 100 cc of toluene is centrifuged, the amount of the powder precipitated is 0.1 g. Further, it is described that a medium for the organosilica sol having a water content of 10% or less, which is a raw material, is a hydrophilic organic solvent, and a hydrophobic organic solvent which is compatible each other can be used in combination. It is also described that an alcohol having 3 or less carbon atoms directly reacts with the silylating agent, and therefore is not preferable as the hydrophilic solvent.

JP-A-3-187913 describes that a trimethylsilylating agent is added to a methanol sol obtained by hydrolyzing alkyl silicate in methanol, in an amount of 5 mol % or more per 1 mol of $SiO_2$ in terms of silica to conduct reaction, and excess trimethylsilylating agent and dispersion solvent are distilled off to obtain a silica powder having excellent dispersibility, surface of which being silylated. For example, 20 mol %, per 1 mol of $SiO_2$ in terms of silica, of methoxytrimethylsilane is added to silica particle methanol dispersion obtained by hydrolyzing tetramethylsilane in methanol in the presence of aqueous ammonia, and excess silylating agent is recovered, followed by drying, to obtain hydrophobic silica powder.

U.S. Pat. No. 5,651,921 (corresponding to JP-A-4-108606 and 4-170313) discloses a process of producing a water repellent silica sol, which comprises silylating silica surface of a non-polar organic solvent-dispersed silica sol. It is disclosed therein that the non-polar organic solvent-dispersed silica sol is obtained by adding the non-polar organic solvent to an alcohol-dispersed silica sol, and substituting a solvent by distillation. This U.S. patent also discloses a process of producing a water repellent silica sol by a process of adding a non-polar organic solvent, a cationic surface active agent and a silylating agent to an aqueous silica sol to form an emulsion, and then removing water from the emulsion by azeotropic dehydration.

JP-A-6-298519 discloses a process of producing a water repellent silica sol by adding a non-polar organic solvent, a water-soluble alcohol, a cationic surface active agent and a silylating agent to an aqueous silica sol to separate a water layer, and then dehydrating an organic layer under reflux.

European Patent Publication 768351 (corresponding to International Patent Publication WO96/34063) discloses a process of producing a dispersion of a solvent-dispersed inorganic oxide sol, comprising removing water contained in an aqueous inorganic oxide sol under azeotropic distillation with an azeotropic agent for water, and surface treating with a silane coupling agent, and also a process of substituting the dispersion of the solvent-dispersed inorganic oxide sol with other solvent. Silica sol and the like are listed as the inorganic oxide. Monoalkyltrimethoxysilane compounds, monoalkyltriethoxysilane compounds, dialkyldimethoxysilane compounds, and the like are listed as the silane coupling agent. Water-soluble alcohols and the like are listed as the azeotropic solvent. Alcohol, methyl ethyl ketone, methyl isobutyl ketone, dimethyl acetoamide and the like are exemplified as a solvent which can further substitute the dispersion of a solvent-dispersed inorganic oxide sol. Experimental example 17 of the European patent publication discloses a process of producing a silica sol having an average particle size of 30 nm dispersed in cyclohexane by substituting a solvent of an aqueous sol having an average particle size of 20 nm with isopropyl alcohol, surface treating with methyltrimethoxysilane, and further substituting the solvent with cyclohexane.

A process comprising substituting an aqueous silica sol with a water-soluble solvent, and further substituting with a hydrophobic organic solvent has conventionally been known as a process of forming an organosilica sol dispersed in a hydrophobic organic solvent using an aqueous silica sol as a raw material. However, the organosilica sol obtained by this process is unstable because of low hydrophilicity of a solvent which ultimately becomes a dispersion medium. For this reason, agglomeration of particles occurs in the solvent substitution step or during storage of a sol obtained, and viscosity increase or agglomeration precipitation may often occur. Thus, a sol having high concentration, low viscosity and storage stability over long period of time is not yet obtained.

Further, to disperse the sol in hydrophobic organic solvent a process of subjecting silica surface to hydrophobic treatment has been proposed.

One of conventional hydrophobic treatment methods is a method of heating a sol in the presence of excess alcohol to esterify silanol groups on the silica particle surface. This reaction requires high temperature, so that where alcohol having a low boiling point is used, it is required to heat in, for example, an autoclave. Alternatively, a method of heating a sol in high boiling point alcohol may be used. However, the high boiling alcohol has the problem that it is difficult to remove excess alcohol after reaction. The hydrophobic silica obtained by this esterification method has the disadvantage that hydrophobicity tends to be lost by hydrolysis of alkoxy group.

Another conventional method for hydrophobic treatment is a method of treating silica surface with a silylating agent or a silane coupling agent. Compared with the esterification method, this method can conduct reaction under relatively mild conditions, and some methods are proposed.

A method of treating a silica sol with trialkoxysilane compounds or dialkoxysilane compounds to improve dispersibility in an organic solvent or paint is widely conducted. However, considerably large amount of alkoxysilane compounds must be used in order to disperse the sol in hydrophobic organic solvent, and therefore this method is not always efficient. Further, since trialkoxysilane compounds or dialkoxysilane compounds are polyfunctional, not only reaction with a silica sol but also condensation reaction of alkoxysilane compounds each other tends to occur, and because of the condensation reaction gelation or cross linking between particles may also occur. Thus it is difficult to obtain hydrophobic organosilica sol having good dispersibility. In addition, it is difficult to remove a condensate of residual alkoxysilane compounds which are not bonded to a silica sol, and the condensate of residual alkoxysilane compounds may adversely affect in using the hydrophobic organosilica sol to a paint or the like.

Chlorosilane compounds also have conventionally widely used for hydrophobic treatment. Those compounds have high reactivity, but had the problem in corrosion of an apparatus due to hydrochloric acid by-produced, agglomeration of colloidal silica in reaction, and the like. Further, it is difficult to completely remove hydrochloric acid from a silica sol after treatment.

Further, where alkali siliconate compounds are used, it is difficult to remove an alkali by-produced, and where sila-zane compounds are used, it is also difficult to remove ammonia by-produced. Such by-products may impair the performance of a sol which is the final product.

Further, the conventional process of conducting a hydrophobic reaction of silica particles, drying the product, pulverizing the product, and dispersing the resulting powder in other organic solvent is an advantageous process for removing an alcohol, hydrochloric acid, ammonia and the like by-produced by hydrophobic reaction. However, agglomeration and bonding of particles tend to occur in drying the particles. In order to prevent this, a covering proportion of a silica particle surface with hydrophobic groups must be increased, but it was even still difficult to completely prevent the agglomeration and bonding. For example, when a hydrophobic powder is redispersed, a precipitate is caused in an amount of 1% or more per powder, as described in the examples of JP-A-58-145614. Therefore, in order to prevent bonding between particles during drying the silica particle surface must be covered in high proportion. As a result, the sol obtained does not have bonding property even if dried, and also it was difficult to further react unreacted silanol groups with other reagent such as a silane coupling agent.

A process is known comprising surface treating with a silylating agent or a silane coupling agent and then conducting a solvent substitution. However, in the convention process, viscosity of a sol after surface treatment may increase, and thus it was difficult to conduct a solvent substitution of post-treatment in high concentration. Further, agglomerate may be formed or gelation may occur by polymerization of a silane coupling agent, during the solvent substitution.

In a process of directly silylating a silica particle surface in a non-polar organic solvent as disclosed in U.S. Pat. No. 5,651,921, an aggregation of a non-polar organic solvent-dispersed silica sol tends to occur, and a silica sol of low viscosity sufficiently dispersed even after surface treatment cannot be obtained. In addition, a silica concentration cannot be increased, and such a silica sol is only applied to a limited use.

Even in any of processes, dispersion of silica particles is not sufficient. For this reason, addition of a large amount of a surface treating agent or reaction at high temperature is required, and this is not an industrially efficient process.

SUMMARY OF THE INVENTION

Accordingly, an object of the present invention is to provide a process of industrially efficiently producing a silica sol which is stably dispersed in a hydrophobic organic solvent, does not contain agglomerate and the like, and has low viscosity even in high concentration.

According to the invention, there is provided a process of producing a hydrophobic organosilica sol which comprises aging a reaction mixture at 0 to 100° C. in the state that an alkali present in the reaction mixture is removed or is neutralized with an acid in an equivalent amount or more, thereby forming a silylation-treated silica sol having a hydrophobic colloidal silica dispersed therein, the reaction mixture comprising: a hydrophilic colloidal silica having a specific surface area of 5.5 to 550 $m^2/g$ in $SiO_2$ concentration of 5 to 55% by weight, a silylating agent of a disiloxane compound and/or monoalkoxysilane compound in a millimolar ratio of 0.03 to 2 in terms of Si atom per 100 $m^2$ of a surface of the hydrophilic colloidal silica, and a medium, as a residue thereof, comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium.

According to a first aspect of the present invention, there is provided a process of producing a hydrophobic organosilica sol which comprises the steps of:

(A) aging a reaction mixture at 0 to 100° C. in the state that an alkali present in the reaction mixture is removed or is neutralized with an equivalent amount or more of an acid, to form a silylation-treated silica sol having a hydrophobic colloidal silica dispersed therein, said reaction mixture comprising:

a hydrophilic colloidal silica having a specific surface area of 5.5 to 550 m²/g in SiO₂ concentration of 5 to 55% by weight, a silylating agent represented by the following formulae (I) and/or (II) in a millimolar ratio of 0.05 to 2 in terms of Si atom per 100 m² of a surface area of the hydrophilic colloidal silica,

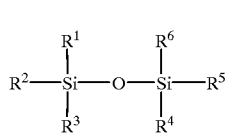

(I)

wherein $R^1$, $R^2$, $R^3$, $R^4$, $R^5$ and $R^6$ each independently represent one substituent selected from the group consisting of alkyl groups having 1 to 20 carbon atoms and phenyl groups, which may optionally be substituted;

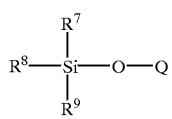

(II)

wherein $R^7$, $R^8$ and $R^9$ each independently represent one substituent selected from the group consisting of alkyl groups having 1 to 20 carbon atoms and phenyl groups, which may be optionally substituted, and Q represents one substituent selected from the group consisting of alkyl groups having 1 to 3 carbon atoms, which may be substituted, and a medium comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium, and (B) distilling the silylation-treated silica sol produced in step (A) above to produce the hydrophobic organosilica sol wherein a medium of the silylation-treated silica sol is substituted with the hydrophobic organic solvent.

According to a second aspect of the present invention, there is provided a process of producing a hydrophobic organosilica sol which comprises the steps of:

(A) aging a reaction mixture at 0 to 100° C. in the state that an alkali present in the reaction mixture is removed or is neutralized with an equivalent amount or more of an acid, to produce a silylation-pretreated silica sol having a hydrophobic colloidal silica dispersed therein, said reaction mixture comprising:

a hydrophilic colloidal silica having a specific surface area of 5.5 to 550 m²/g in SiO₂ concentration of 5 to 55% by weight, a silylating agent represented by the following formulae (I) and/or (II) in a millimolar ratio of 0.03 to 1.5 in terms of Si atom per 100 m² of a surface area of the hydrophilic colloidal silica,

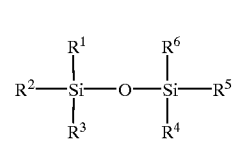

(I)

wherein $R^1$, $R^2$, $R^3$, $R^4$, $R^5$ and $R^6$ each independently represent one substituent selected from the group consisting of alkyl groups having 1 to 20 carbon atoms and phenyl groups, which may optionally be substituted;

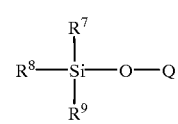

(II)

wherein $R^7$, $R^8$ and $R^9$ each independently represent one substituent selected from the group consisting of alkyl groups having 1 to 20 carbon atoms and phenyl groups, which may be optionally substituted, and Q represents one substituent selected from the group consisting of alkyl groups having 1 to 3 carbon atoms, which may be substituted, and a medium comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium, (B) distilling the silylation-pretreated silica sol produced in step (A) above to produce an alcohol-containing hydrophobic organosilica sol wherein a medium of the silylation-pretreated silica sol is substituted with the hydrophobic organic solvent until the alcohol having 1 to 3 carbon atoms is a weight ratio of 0.05 to 5 to the hydrophobic organic solvent having a solubility of water of 0.1 to 12% by weight, (C) producing a reaction mixture comprising:

the alcohol-containing hydrophobic organosilica sol produced in step (B), the silylating agent represented by the above formulae (I) and/or (II) in the total addition amount in step (A) and step (C) of a millimolar ratio of 0.05 to 2 in terms of Si atom per 100 m² of a surface area of a hydrophilic colloidal silica which is a raw material of the hydrophobic colloidal silica in the alcohol-containing hydrophobic organosilica sol, and a medium comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium, and aging the reaction mixture at 0 to 100° C. to produce a silylation-treated silica sol having the hydrophobic colloidal silica dispersed therein, and (D) distilling the silylation-treated silica sol produced in step (C) above to produce the hydrophobic organosilica sol wherein a medium of the silylation-treated silica sol is substituted with the hydrophobic organic solvent. According to a third aspect of the present invention, a process of producing a preferable hydrophobic organosilica sol is featured, in the first as and the second aspect, by that the silylating agent is hexamethyl disiloxane.

According to a fourth aspect of the present invention, a process of producing a preferable hydrophobic organosilica sol is featured, in the first aspect and the second aspect, by that the silylating agent is at least one selected from the group consisting of trimethylmethoxysilane, trimethylethoxysilane and trimethylpropoxysilane.

In this case, a process for forming the reaction mixture in step (A) in the first aspect and the second aspect of the present invention includes the following three aspects of the present invention (a fifth aspect to a seventh aspect).

The process for forming the reaction mixture according to the fifth aspect of the present invention comprises the following steps of (a), (b) and (c).

(a) An alcohol having 1 to 3 carbon atoms is added to an acidic aqueous silica sol containing a hydrophilic colloidal silica having a specific surface area of 5.5 to 550 $m^2/g$. The resulting aqueous medium of the acidic aqueous silica sol is substituted with the alcohol by distillation of the acidic aqueous silica sol to which the alcohol having 1 to 3 carbon atoms is added, to thereby produce an alcohol-silica sol in $SiO_2$ concentration of 6 to 55% by weight and a water content of 15% by weight of less.

(b) A hydrophobic organic solvent having a solubility of water of 0.1 to 12% by weight is added to the alcohol-silica sol produced in the step (a) to thereby produce a mixture organic solvent silica sol containing a silica in $SiO_2$ concentration of 5 to 55% by weight and a medium as a residue thereof comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium.

(c) To the mixture organic solvent silica sol produced in the step (b), silylating agent represented by general formula (I) and/or general formula (II) described above is added then mixtured to produce a reaction mixture.

The process for forming the reaction mixture according to the sixth aspect of the present invention comprises the following steps of (a) and (b).

(a) An alcohol having 1 to 3 carbon atoms and a hydrophobic organic solvent having a solubility of water of 0.1 to 12% by weight are added to an acidic aqueous silica sol containing a hydrophilic colloidal silica having a specific surface area of 5.5 to 550 $m^2/g$. The resulting aqueous medium of the acidic aqueous silica sol is substituted with the alcohol and the hydrophobic organic solvent by distillation of acidic aqueous silica sol to which the alcohol and the hydrophobic organic solvent are added, to thereby produce a mixture organic solvent silica sol containing a silica in $SiO_2$ concentration of 5 to 55% by weight and a medium as a residue thereof comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium.

(b) To the mixture organic solvent silica sol produced in the step (a), silylating agent represented by general formula (I) and/or general formula (II) described above is added then mixtured to produce a reaction mixture.

The process for forming the reaction mixture according to the seventh aspect of the present invention comprises the following steps of (a) and (b).

(a) An alcohol having 1 to 3 carbon atoms is added to an acidic aqueous silica sol containing a hydrophilic colloidal silica having a specific surface area of 5.5 to 550 $m^2/g$. The resulting aqueous medium of the acidic aqueous silica sol is substituted with the alcohol by distillation of the acidic aqueous silica sol to which the alcohol having 1 to 3 carbon atoms is added, to thereby produce an alcohol-silica sol containing silica in $SiO_2$ concentration of 5 to 55% by weight and a medium as a residue thereof comprising the alcohol and water in an amount of 15% by weight or less based on the weight of the medium.

(b) To the alcohol-silica sol produced in the step (a), a solution obtained by adding a silylating agent represented by general formula (I) and/or general formula (II) described above to a hydrophobic organic solvent having a solubility of water of 0.1 to 12% by weight and a weight ratio of 0.05 to 20 of the alcohol in the alcohol-silica sol, is added then mixtured to produce a reaction mixture.

DETAILED DESCRIPTION OF THE PREFERRED EMBODIMENT

The hydrophilic colloidal silica in the reaction mixture of the present invention is fine particles of non-agglomerating silica having a specific surface area of 5.5 to 550 $m^2/g$.

Further, it is fine particles of a non-agglomerating silica which are stably dispersed in a medium, as appeared in, for example, an aqueous silica or an organosilica sol. The fine particles of silica have free silanol groups on its surface, and a part of the silanol groups may be ester-bonded with an alcohol having 1 to 3 carbon atoms.

The hydrophilic colloidal silica is obtained from the aqueous silica sol. The aqueous silica sol can be produced by the conventional process using water glass as a raw material. The hydrophilic colloidal silica can also be produced from an alcohol-containing aqueous silica sol which is formed by hydrolyzing an alkoxysilane compound in the presence of an alkaline catalyst such as ammonia.

In step (A) in a first aspect and step (A) of a second aspect of the present invention, if a free alkali is present in the reaction mixture, the silylating agent of the present invention does not react with silanol groups on the surface of the hydrophilic colloidal silica. Therefore, in aging the alkali present in the reaction mixture must be removed or must be neutralized with an acid more than the equivalent. For this reason, an acidic aqueous silica sol from which an alkali has previously been removed is preferably used as a raw material for the reaction mixture. A production process of a reaction mixture using the alkali-removed acidic aqueous silica sol as a raw material of the reaction mixture is the fifth aspect, the sixth aspect, the seventh aspect and the like.

The acidic aqueous silica sol using water glass as a raw material preferably has a pH of 2 to 4.5. For example, an acidic sol obtained by removing free cations from an alkaline silica sol by a method such as ion-exchange or an acidic sol obtained by removing cations and almost all or the entire amount of anions by a method such as ion-exchange from the alkaline silica sol is preferably used. A small amount of an acid such as sulfuric acid or carboxylic acid may be added to the ion-exchanged sol to adjust the pH. The acid may previously be added if prior to formation of the reaction mixture. The acid may also be added after substituting a part or almost all of a solvent of the acidic aqueous silica sol with other solvent.

An alcohol-containing acidic aqueous silica sol from which an alkaline catalyst such as ammonia has been removed by a cation-exchange treatment can be used as an alcohol-containing aqueous silica sol produced by hydrolyzing an alkoxysilane compound in the presence of an alkaline catalyst such as ammonia. In the case of this alcohol-containing acidic aqueous silica sol, addition of an alcohol solvent may be omitted in the present invention.

In neutralizing an alkali present in the reaction mixture with an acid more than the equivalent, the neutralization may be conducted by adding an acid such as sulfuric acid or carboxylic acid if prior to the formation of the reaction mixture. The neutralization may also be conducted after substituting a part or almost all of a solvent of the acidic aqueous silica sol with other solvent.

If the pH of the acidic aqueous silica sol exceeds 4.5, it is difficult for the silylation reaction to proceed in step (A) of the first aspect and steps (A) and (C) of the second aspect of the present invention. On the other hand, if the pH is less than 2.0, stability of the sol tends to be impaired.

Examples of the alcohol having 1 to 3 carbon atoms used in the present invention include methanol, ethanol, n-propanol, isopropanol and mixed solvents thereof. Particularly preferred alcohol is methanol and ethanol. When those alcohols are used, viscosity increase is difficult to occur in solvent substitution or silylation reaction step, and this makes it possible to perform reaction and solvent substitution at high concentration.

$SiO_2$ concentration of the acidic aqueous silica sol is preferably 5 to 55% by weight.

Specific surface area of the hydrophilic colloidal silica is 5.5 to 550 $m^2/g$, preferably 27 to 550 $m^2/g$ and more preferably 90 to 550 $m^2/g$. A particle size of the hydrophilic colloidal silica is calculated with an equation of $D(nm)= 2720/S$ wherein S is a specific surface area ($m^2/g$) obtained by a BET method. Therefore, the particle size of the hydrophilic colloidal silica is 5 to 500 nm, preferably 5 to 100 nm and more preferably 5 to 30 nm. If the particle size is less than 5 nm, it is difficult to make the concentration of the sol high, and also a large amount of a silylating agent per silica unit weight is needed for its surface treatment. On the other hand, if the particle size is larger than 500 nm, the precipitation property of silica in the sol is large, and the storage stability of the sol is poor.

The hydrophobic organic solvent having a solubility of water of 0.1 to 12% by weight in the present invention means a solvent that it is not uniformly mixed with water, and when it is mixed with water at 20° C. to form two phases, the water content in the organic phase is 0.1 to 12% by weight. Examples of the hydrophobic organic solvent include 1-pentanol (solubility of water: 6.8% by weight; hereinafter the same), methyl ethyl ketone (9.9% by weight), methyl isobutyl ketone (1.8% by weight), cyclohexanone (8% by weight), ethyl acetate (2.9% by weight), n-butyl acetate (1.9% by weight), methyl methacrylate (1.1% by weight), diisopropyl ether (0.55% by weight) and dibutyl ether (0.2% by weight). Examples of the hydrophobic organic solvent having a solubility of water of less than 0.1% by weight are toluene (0.05% by weight) and the like.

It was found that difference in the dispersibility of the silica sol depending on a kind of the dispersion solvent is particularly greatly influenced by the ability to dissolve water in the solvent. The solubility of solvent in water is not so important. In the use of the hydrophobic organic solvent having a solubility of water of 0.1 to 12% by weight, if solvent substitution is conducted without surface treatment, viscosity of the silica sol shows considerably high value, or the stability of the sol becomes poor, resulting in gelation.

In the use of the hydrophobic organic solvent which is not uniformly mixed with water but has a solubility of water exceeding 12% by weight, the sol dispersed in this solvent can be formed by substitution of hydrophilic solvent sol without conducting surface treatment. Further, in step (A) in the first aspect and steps (A) and (C) in the second aspect of the present invention, those solvents cannot suppress increase of viscosity in the silylation reaction. Examples of such a solvent include n-butanol (16.4% by weight) and isobutanol (20% by weight).

On the other hand, the hydrophobic organic solvent having a solubility of water of less than 0.1% by weight has high hydrophobicity. Therefore, a degree of silylation must be increased, and as a result, a considerably large amount of the silylating agent is needed.

Particularly preferred compounds as a solvent for the organosilica sol obtained by the process of the present invenion are ketone compounds such as methyl ethyl ketone, methyl isobutyl ketone or cyclohexanone, carboxylic acid ester compounds such as ethyl acetate, butyl acetate, methyl acrylate, methyl methacrylate or carbitol acetate, ether compounds such as dibutyl ether, and the like. Mixed solvents of the above-described solvent can also preferably be used.

A process for forming the reaction mixture in step (A) in the first aspect and the second aspect of the present invention includes the fifth aspect, the sixth aspect, seventh aspect and the like.

Further, a solvent distillation substitution method is used in the fifth, sixth, and seventh aspect, but conventional solvent substitution methods such as solvent ultrafiltration substitution method or solvent pervaporation substitution can also be used.

$SiO_2$ concentration in the reaction mixture is preferably 5 to 55% by weight, and more preferably 10 to 45% by weight. If the concentration is less than 5% by weight, production efficiency is decreased, and also a necessary amount of the silylating agent per surface area of the silica is increased due to decrease of the silylating agent concentration in the solvent, which are undesirable. On the other hand, if the concentration is more than 55% by weight, stability of the sol becomes insufficient, and it is difficult to obtain a sol having good dispersibility. If water in the medium of the reaction mixture increases, viscosity of the sol may rise. Further, silylation reaction may be hindered. Therefore, the amount of water in the medium of the reaction mixture is preferably 15% by weight or less, and more preferably 5% by weight or less.

Of the above methods, a method of removing water by solvent distillation substitution method is particularly preferred in order to form the reaction mixture having low water content.

A mixed solvent in the medium in the reaction mixture is preferably that alcohol having 1 to 3 carbon atoms is 0.05 to 20 in weight ratio to the hydrophobic organic solvent having a solubility of water of 0.1 to 12% by weight. In step (A) of the first aspect the weight ratio of 0.1 to 20 is more preferable, in step (A) of the second aspect the weight ratio of 0.5 to 20 is more preferable and in step (C) of the second aspect the weight ratio of 0.05 to 1 is more preferable.

If an alcohol exceeds 20 in weight ratio to the hydrophobic organic solvent, remarkable viscosity increase tends to occur with progress of the reaction when the silylation reaction is conducted. In particular, this viscosity increase becomes vigorous as the conversion of the silylation reaction is increased. As a result, the reaction does not proceed uniformly in the system, and the solvent substitution in the next step becomes difficult. On the other hand, if an alcohol is less than 0.05 in weight ratio to the hydrophobic organic solvent, viscosity increase or gelation occurs before conducting surface treatment of the silylating agent for the reaction mixture.

More preferable ratio of the solvent varies depending on the kind of the alcohol and hydrophobic organic solvent used. For example, where a hydrophobic organic solvent having a small solubility in water is used, viscosity increase may occur even if the weight ratio of alcohol to the hydrophobic organic solvent is larger than 0.05. As the kind of such alcohol, for example, methanol is preferable because, even if methanol has a small proportion of the hydrophobic organic solvent as compared with propanol, viscosity increase is difficult to occur when silylation reaction proceeds. The kind and reactivity of the silylating agent also affect viscosity increase.

In step (A) of the first aspect and steps (A) and (C) of the second aspect of the present invention, silylation reaction is conducted containing disiloxane compound and/or monoalkoxysilane compound in the reaction mixture.

The disiloxane compound used as the silylating agent in the present invention is represented by the following formula

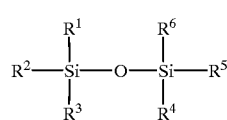

(I)

wherein $R^1$, $R^2$, $R^3$, $R^4$, $R^5$ and $R^6$ each independently represent one substituent selected from the group consisting of alkyl groups having 1 to 20 carbon atoms and phenyl groups, which may optionally be substituted.

Examples of the disiloxane include hexamethyl disiloxane, 1,3-bibutyltetramethyldisiloxane, 1,3-diphenyltetramethyl disiloxane, 1,3-divinyltetramethyl disiloxane, hexaethyl disiloxane and 3-glycidoxypropylpentamethyl disiloxane. Of those, hexamethyl disiloxane is particularly preferred.

The monoalkoxysilane compound used as the silylating agent is represented by the following formula (II):

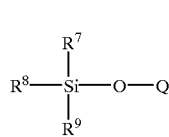

(II)

wherein $R^7$, $R^8$, and $R^9$ each independently represent one substituent selected from the group consisting of alkyl groups having 1 to 20 carbon atoms and phenyl groups, which may optionally be substituted, and Q represents one substituent selected from the group consisting of alkyl groups having 1 to 3 carbon atoms, which may optionally be substituted.

Examples of the monoalkoxysilane compound include trimethylmethoxysilane, trimethylethoxysilane, trimethylpropoxysilane, phenyldimethylmetoxysilane and chloropropyldimethylmethoxysilane. Of those, trimethylmethoxysilane, triethylmethoxysilane and trimethylpropoxysilane are particularly preferred.

Those silylating agents may be used alone or as mixtures, of two or more thereof.

A trialkoxysilane compound which is frequently used for surface treatment of inorganic particles has three bonding groups, and therefore has high reactivity. However, it causes self polymerization or condensation between particles, and it is difficult to obtain a sol having good dispersibility. In addition, unbonded silanol groups generated from alkoxy groups tend to be remained in large amount, and dispersion effect of particle is also insufficient. The silylating agent used in the present invention is a monofunctional compound, and does not cause self polymerization or crosslinking between silica particles to occur.

Halogenated silane or silazane compounds generally used in the silylation treatment by-produce hydrogen halides or ammonia at the time of reaction, and those induce aggregation of sol. On the other hand, reaction by-products of the silylating agent used in the present invention are water or an alcohol having 1 to 3 carbon atoms, and those by-products do not have the possibility to induce aggregation of silica particles, and the like. Further, those by-products can easily be removed in step (B) in the first aspect and step (B) and step (D) in the second aspect of the present invention, which are post-steps.

In particular, hexamethyl disiloxane, trimethylmethoxysilane, trimethylethoxysilane and trimethylpropoxysilane have high reactivity, are inexpensive and can easily be removed and recovered by distillation operation. Therefore, use of those compounds is preferable.

Hexamethyl disiloxane has been used as a silylating agent for determining a structure of silicic acid minerals. However, it has generally low reactivity, and has therefore been used by hydrolyzing with, for example, hydrochloric acid aqueous solution having a pH of 1 or less. However, it has been found that when hexamethyl disiloxane is contained in a weakly acidic reaction mixture, it is adsorbed on the surface of hydrophilic colloidal silica and then reacted to silylate silanol groups, thereby forming a small amount of water. If the pH of the reaction mixture exceeds 4.5, the reaction proceeds very slowly. Further, in order to make the pH to less than 2, a large amount of an acid must be added to the sol, and stability of the sol itself is impaired, which is not preferable. The "pH" in the reaction mixture used herein means a pH obtained by mixing the reaction mixture and an equivalent weight of pure water, and measuring pH thereof with a glass electrode method.

In order to stably disperse silica particles in the hydrophobic organic solvent, the amount of silyl groups bonded on the surface of the hydrophilic colloidal silica is preferably 0.3 to 3, and more preferably 0.5 to 3, per 1 $nm^2$ of surface area of the silica. If the amount of silyl group bonded on the silica surface is less than 0.3/$nm^2$, such an amount is insufficient to impart stability to the silica, so that viscosity increase may occur in the course of solvent substitution, or the stability of the hydrophobic sol formed may become insufficient. On the other hand, in order to bond the silyl group on the silica surface in an amount of 3/$nm^2$ or more, the silylating agent must be added in large excess, which is not preferable. The necessary amount of the silyl groups varies depending on the degree of hydrophobicity of a dispersion medium of the sol or the purpose of use of the sol. Where bondability between particles is needed or reactivity is needed between silanol groups on the particle surface and other reagent, the amount of silanol groups bonded is decreased. On the other hand, where it is required to make the silica surface more hydrophobic, the amount of silanol groups bonded is increased. Compatibility of the silica particles with a hydrophobic resin solution is generally increased as the amount of silanol groups bonded is increased.

The amount of silanol groups bonded to the silica surface can be determined by, for example, a method of drying a sol under a reduced pressure to obtain a silica powder obtained, and measuring a carbon content of the silica powder. Further, the bonding amount of silyl groups per unit area can be calculated by dividing the bonding amount obtained above by a specific surface area of silica obtained by a BET method.

The amount of the silylating agent added varies depending on the necessary amount of silyl groups, reaction conditions, or the like, but the amount is generally 0.03 to 2 millimol, and preferably 0.05 to 2 millimol, in terms of Si atom, per 100 $m^2$ of a specific surface area of a hydrophilic colloidal silica in a sol. Although depending on the reaction conditions, the amount of the silylating agent added is preferably in slight excess (generally 1 to 3 times) than the required amount thereof to be bonded. In particular, where a low boiling point silylating agent such as hexamethyl disiloxane or trimethylmethoxysilane is used, excess silylating agent is easily removed by the subsequent step (B) of distillation. Therefore, it is efficient to add the silylating agent in slight excess and to shorten reaction time. Further, where it is desired to increase the surface covering proportion of the silyl groups, it is required to use the silylating agent in excess or to sufficiently prolong the reaction time in view of the fact that the reaction rate is gradually decreased by a steric hindrance of silyl groups previously bonded to the silica surface. Furthermore, the conversion can be increased as the amount of water or an alcohol in the mixture organic solvent silica sol is decreased. If in the medium of the reaction mixture water and alcohol are present together in large amount, yield of the silylation tends to decrease. Therefore, it is preferable to add the silylating agent in slight excess relative to the bonding amount necessary for hydrophobization.

If the silylating agent lacks or the reaction is insufficient, viscosity increase may occur in the course of solvent substitution by the hydrophobic organic solvent in step (B) of the first aspect and steps (B) and (D) of the second aspect of the present invention.

A method of containing the silylating agent of the present invention in the silica sol is not particularly limited. The preferable method is that the silylating agent diluted with a crude liquid or an appropriate solvent is added to a sol which is stirred, and the resulting mixture is stirred until obtaining a uniform mixture.

The silylating agent may be added by dividing the same into two or more portions. After the silylation treatment, a method can also be used that after solvent substitution, the silylation treatment is again conducted. According to this method, a degree of silylation of the final sol can further be increased.

The silylation reaction proceeds even at normal temperature after addition of the silylating agent, but the reaction can be promoted by heating. At normal temperature the reaction is preferably conducted for at least one day. The reaction time under heating is generally within several hours. Heating is preferably conducted at a temperature lower than the boiling point of the reaction solvent used, and is more preferably conducted at a temperature of 40 to 100° C.

If the disiloxane compound is slowly reacted at relatively low temperature (in the vicinity of normal temperature) under the condition that methanol, ethanol, or the like is present together in large amount, by-production of the alkoxysilane compound can be suppressed, and the yield of reaction can be increased.

The organosilica sol dispersed in the hydrophobic organic solvent is produced by distilling the silylation-treated silica sol and distilling off water and alcohol, in step (B) of the first aspect and steps (B) and (D) of the second aspect of the present invention. If required and necessary, the hydrophobic organic solvent may simultaneously be supplied to maintain SiO2 concentration to 55% by weight or less, and this is a preferable method. Distillation is conducted in step (B) of the first aspect and step (D) of the second aspect of the present invention until that the water content is preferably 0.5% by weight or less, and more preferably 0.2% by weight or less. If water is sufficiently removed, the stability of the sol during storage is further improved.

The distillation may be conducted at atmospheric pressure or under reduced pressure. If solvent having a high boiling point is used, the distillation is preferably conducted under reduced pressure.

Further, the distillation may be conducted while distilling off the hydrophobic organic solvent used in step (B) of the first aspect and steps (B) and (D) of the second aspect of the present invention, and adding other hydrophobic organic solvent. According to the process of the present invention, a sol having good dispersibility and low viscosity can be obtained. The viscosity is 5 times or less (specific viscosity: 5 or less) to the viscosity of the hydrophobic organic solvent which is a dispersion medium when the sol contain silica of 20% by weight in terms of SiO2.

A process of producing the reaction mixture in step (A) of the first aspect and the second aspect of the present invention includes the fifth aspect, the sixth aspect and the seventh aspect.

It is possible to simultaneously conduct addition of the alcohol having 1 to 3 carbon atoms in step (a) of the fifth aspect and addition of the hydrophobic organic solvent in step (b) thereof. This method is the sixth aspect.

It is possible to simultaneously conduct addition of the hydrophobic organic solvent in step (b) of the fifth aspect and addition of the silylating agent in step (c) thereof. Viscosity increase does not occur without hydrophobic organic solvent until the silylation reaction does not proceed sufficiently. Therefore, a method of, for example, diluting the silylating agent with a necessary amount of the hydrophobic organic solvent, and adding the diluted silylating agent may be used. This method is the seventh aspect.

Containing the silylating agent in the reaction mixture of step (A) of the first aspect and aging the same can be separately conducted into two or more steps. In this method, the proportion of the hydrophobic organic solvent can be increased by conducting distillation. This is a useful method when it is desired to produce an organic sol of a hydrophobic organic solvent having smaller solubility of water or to increase the silylated proportion on the silica surface. This method is the second aspect.

The present invention is described in more detail by reference to the following examples, but the invention is not limited thereto.

EXAMPLE 1

450 g of commercially available acidic aqueous silica sol (SNOWTEX-O, registered trade mark), $SiO_2$ concentration: 20% by weight; pH: 3.0; particle size: 12 nm) was condensed to 200 g in a rotary evaporator by vacuum distillation. 160 g of isopropyl alcohol (IPA) and 800 g of methyl ethyl ketone (MEK) were added to the condensed acidic aqueous silica sol thus obtained to obtain an organic solvent-silica sol mixture (SiO$_2$ concentration: 7.8% by weight; water content: 9.5% by weight; IPA:MEK=1:5 in weight ratio).

10 g of hexamethyl disiloxane (0.6 millimol/surface area of 100 m$^2$ of hydrophilic colloidal silica) was added to the organic solvent-silica sol mixture obtained above, and the resulting mixture was stirred to obtain a reaction mixture. The reaction mixture was allowed to stand still at room temperature for 7 days to age, thereby obtaining a silylation-treated silica sol. This silylation-treated silica sol was condensed to a total liquid amount of 300 ml by vacuum distillation under reduced pressure of 100 Torr (0.013 MPa). Solvent substitution was conducted by vacuum distillation while adding 500 g of MEK such that the total liquid amount is constant at 300 ml to obtain 300 g of an MEK-dispersed hydrophobic organosilica sol (SiO$_2$ concentration: 30% by weight; specific gravity at 20° C.: 1.004; viscosity at 20° C.: 1.1 mPa.s; water content: 0.2% by weight: IPA concentration: 0.3% by weight). The sol obtained was diluted with MEK such that the SiO$_2$ concentration was 20% by weight, and the viscosity of the diluted sol was measured. As a result, the viscosity at 20° C. was 0.76 mPa.s, and specific viscosity to the solvent was 1.8. The MEK-dispersed hydrophobic organosilica sol was dried at 50° C. under reduced pressure, pulverized and further dried at 110° C. for 1 hour. As a result of elemental analysis of the resulting powder, a carbon content was 1.22% by weight. This corresponded to 0.9 per silica surface area of 1 nm$^2$ as the amount of trimethylsilyl group bonded.

COMPARATIVE EXAMPLE 1

An organic solvent-silica sol mixture was prepared in the same manner as in Example 1, and distillation was conducted without addition of the silylating agent. The organic solvent-silica sol mixture markedly increased its viscosity in the course of condensation by vacuum distillation under reduced pressure of 100 Torr (0.013 MPa), and the desired methyl ethyl ketone (MEK) dispersed organosilica sol was not obtained.

COMPARATIVE EXAMPLE 2

The same procedure as in Example 1 was conducted except that 16.8 g of methyltrimethoxysilane (0.6 millimol/surface area of 100 m$^2$ of hydrophilic colloidal silica) was added as the silylating agent in place of hexamethyl disiloxane. As a result, the silylation-treated silica sol was condensed to 300 ml by vacuum distillation under a pressure of 100 Torr (0.013 MPa). Vacuum distillation was then conducted while adding methyl ethyl ketone (MEK), but the viscosity was markedly increased in the course of the distillation, and the desired sol was not obtained.

EXAMPLE 2

500 g of methanol silica sol (SiO, concentration: 30% by weight; water content: 1.7% by weight; pH when diluted with distilled water in an equivalent amount of the methanol silica sol:3.4; particle size: 12 nm) was distilled by vacuum distillation under a pressure of 150 Torr (0.020 MPa) using a rotary evaporator while adding ethyl acetate such that the SiO$_2$ concentration was almost constant. When the weight ratio of methanol to ethyl acetate in a medium of the sol was 1, solvent substitution by vacuum distillation was discontinued to obtain an organic solvent-silica sol mixture. 12.8 g of trimethyl methoxysilane (0.36 millimol/surface area 100 m$^2$ of hydrophilic colloidal silica) was added to the organic solvent-silica sol mixture while stirring, and the resulting mixture was aged by heating at a liquid temperature of 60° C. for 2 hours to obtain a silylation-treated silica sol. Solvent substitution by vacuum distillation was conducted while adding ethyl acetate to the silylation-treated silica sol to obtain an ethyl acetate-dispersed hydrophobic aqueous organosilica sol (SiO$_2$ concentration: 30.8% by weight; specific gravity at 20° C. : 1.100; viscosity at 20° C. 1.9 mPa.s; water content: 0.06% by weight; methanol concentration: 0.2% by weight). This sol was diluted with ethyl acetate such that the SiO$_2$ concentration was 20% by weight, and viscosity thereof was measured. As a result, the viscosity at 20° C. was 0.78 mPa.s, and the specific viscosity to the solvent was 1.73.

The amount of trimetylsilyl groups bonded in the ethyl acetate-dispersed hydrophobic organosilica sol was measured in the same manner as in Example 1. As a result, it was found to be 1.2 per 1 nm$^2$ of silica surface area.

COMPARATIVE EXAMPLE 3

Vacuum distillation was conducted under a pressure of 150 Torr (0.020 MPa) while adding ethyl acetate to 500 g of the same methanol silica sol as used in Example 2 such that the SiO$_2$ concentration was almost constant, and solvent substitution by vacuum distillation was continued without addition of trimethylmethoxysilane in the course of the distillation. When the methanol content in the sol was decreased to 30% by weight, the sol became white turbid and increased markedly its viscosity, and the desired ethyl acetate-dispersed hydrophobic organosilica sol was not obtained.

COMPARATIVE EXAMPLE 4

Solvent substitution by vacuum distillation was conducted under a pressure of 150 Torr (0.020 MPa) while adding n-butanol to 500 g of the same methanol silica sol as used in Example 2 such that the SiO$_2$ concentration was almost constant. When the weight ratio of methanol to butanol in a medium of the sol was 1, heating was discontinued to obtain an alcohol-silica sol mixture. 12.8 g of trimethyl methoxysilane (0.36 millimol/surface area 100 m$^2$ of hydrophilic colloidal silica) was added to the alcohol-silica sol mixture obtained, and the resulting mixture was aged by heating at a liquid temperature of 60° C. for 2 hours to obtain a silylation-treated silica sol. This silylation-treated silica sol gradually increased its viscosity during aging, and the viscosity became high. When vacuum distillation was further conducted under a pressure of 150 Torr (0.020 MPa) while adding n-butanol to the silylation-treated silica sol obtained, the viscosity was markedly increased and the desired butanol-dispersed hydrophobic organosilica sol was not obtained.

COMPARATIVE EXAMPLE 5

Solvent substitution by vacuum distillation was conducted under a pressure of 150 Torr (0.020 MPa) while adding ethyl acetate to 500 g of the same methanol silica sol as used in Example 2 such that the SiO$_2$ concentration was almost constant. When the weight ratio of methanol to ethyl acetate in a medium of the sol was 1, heating was discontinued to obtain an organic solvent-silica sol mixture. When 13.4 g of trimethylchrolosilane (0.36 millimol/surface area 100 m$^2$ of hydrophilic colloidal silica) was added to the organic solvent-silica sol mixture while stirring, the resulting mixture immediately became white turbid, and aggregate was formed. The mixture was heated at 60° C. for 2 hours, but white turbidity and viscosity increase were remained unchanged.

EXAMPLE 3

60 g of methyl ethyl ketone (MEK) and 10 g of hexamethyl disiloxane (0.36 millimol/surface area 100 m² of hydrophilic colloidal silica) were added to 500 g of the same methanol silica sol as used in Example 2, followed by stirring. The resulting mixture was allowed to stand at room temperature for 7 days to age the same, thereby obtaining a silylation-treated silica sol. This silylation-treated silica sol was condensed to such that the $SiO_2$ concentration of about 30% by weight by vacuum distillation under a pressure of 150 Torr (0.020 MPa). The vacuum distillation is further continued under a pressure of 150 Torr (0.020 MPa) while adding 554 g of methyl methacrylate such that the $SiO_2$ concentration in the sol was almost constant to obtain a methyl methacrylate-dispersed hydrophobic organosilica sol ($SiO_2$ concentration: 30% by weight; specific gravity: 1.148; viscosity: 5.0 mPa.s; water content: 0.2% by weight; methanol concentration: 0.9% by weight). The silica sol obtained was diluted with methyl methacrylate such that the $SiO_2$ concentration was 20% by weight, and viscosity thereof was measured. As a result, the viscosity at 25° C. was 3.5 mPa.s and the specific viscosity to the solvent was 2.65.

COMPARATIVE EXAMPLE 6

0.2 g of 10% by weight aqueous ammonia was added to 600 g of the same methanol silica sol as used in Example 2. A part of this sol was collected, and diluted with the equivalent amount of water. The pH was measured, and was found to be 5.1. Similar to Example 3, methyl ethyl ketone (MEK) and hexamethyl disiloxane were added to 500 g of this sol, and the resulting mixture was allowed to stand at room temperature for 7 days, thereby obtaining a silylation-treated silica sol. When solvent substitution was conducted by adding methyl methacrylate to this silylation-treated silica sol and conducting distillation under a pressure of 150 Torr (0.020 MPa), viscosity was markedly increased in the course of solvent substitution, and the desired methyl methacrylate-dispersed hydrophobic organosilica sol was not obtained.

COMPARATIVE EXAMPLE 7

10 g (0.36 millimol/surface area 100 m² of hydrophilic colloidal silica) of hexamethyl disiloxane was added to 500 g of the same methanol silica sol as used in Example 2, followed by stirring. The resulting mixture was allowed to stand at room temperature for 7 days to age, thereby obtaining a silylation-treated silica sol having a viscosity at 25° C. of 100 mPa.s.

This silylation-treated silica sol was distilled under a pressure of 150 Torr (0.020 MPa) while adding methyl ethyl ketone (MEK) such that the $SiO_2$ concentration was almost constant, to obtain an MEK-dispersed hydrophobic organosilica sol ($SiO_2$ concentration: 30% by weight; specific gravity: 1.060; viscosity: 9.0 mPa.s; water content: 0.2% by weight; methanol concentration: 0.3% by weight). The silica sol obtained was diluted with MEK such that the $SiO_2$ concentration was 20% by weight, and viscosity thereof was measured. As a result, the viscosity at 25° C. was 5.5 mPa.s and the specific viscosity to the solvent was 13. Further, gel-like product was deposited on an inner wall of a heating vessel of the rotary evaporator during the solvent substitution by vacuum distillation, and the yield was decreased. The sol obtained was contaminated with microgels, and the appearance of the sol was white turbid.

EXAMPLE 4

Commercially available acidic aqueous silica sol (SNOWTEX-OL, registered trade mark, SiO2 concentration: 20% by weight; particle size: 46 nm) was condensed by vacuum distillation under a reduced pressure of 150 Torr (0.020 MPa) with a rotary evaporator, and solvent substitution was then conducted with methanol by distillation at atmospheric pressure to obtain methanol silica sol ($SiO_2$ concentration: 40.6% by weight; water content: 1.4% by weight; pH when methanol silica sol was diluted with the equivalent amount of distilled water: 3.4). A solution obtained by dissolving 15.6 g (0.51 millimol/surface area 100 m² of hydrophilic colloidal silica) of hexamethyl disiloxane in 250 g of methyl isobutyl ketone (MIBK) was added to 1,560 g of this methanol sol under stirring, and the resulting mixture was heated at a liquid temperature of 60° C. for 1 hour while stirring to age the same, thereby obtaining a silylated, pre-treated silica sol. Distillation was then conducted at atmospheric pressure while adding MIBK to the silylated, pre-treated silica sol such that the $SiO_2$ concentration was almost constant. When the weight ratio of methanol to MIBK in a medium of the sol was 0.9, distillation at atmospheric pressure was discontinued to obtain an alcohol-containing hydrophobic organosilica sol. A solution obtained by dissolving 7.8 g of hexamethyl disiloxane (0.26 millimol/surface area 100 m² of hydrophilic colloidal silica) in 72 g of MIBK was added to this alcohol-containing hydrophobic organosilica sol while stirring, and the resulting mixture was heated at a liquid temperature of 60° C. for 1 hour while stirring to age the same, thereby obtaining a silylation-treated silica sol. Solvent distillation was conducted by vacuum distillation under a pressure of 150 Torr (0.020 MPa) while adding MIBK to the silylation-treated silica sol obtained to obtain MIBK-dispersed hydrophobic organosilica sol ($SiO_2$ concentration: 30.5% by weight; specific gravity at 20° C. : 1.000; viscosity at 20° C. : 3.0 mPa.s; water content:0.05% by weight; methanol concentration: 0.1% by weight). This sol was diluted with MIBK such that the $SiO_2$ concentration was 20% by weight, and the viscosity thereof was measured. As a result, the viscosity at 20° C. was 1.3 mPa.s and the specific viscosity to the solvent was 2.64.

EXAMPLE 5

A solution obtained by dissolving 7.9 g (0.19 millimol/ surface area 100 m² of hydrophilic colloidal silica) of 1,3-di(n-butyl)tetramethyl disiloxane in 20 g of diisopropyl ether was added to 500 g of the same methanol silica sol used in Example 2, followed by stirring. The resulting mixture was allowed to stand at room temperature for 10 days to age the same, thereby obtaining a silylation-treated silica sol. The silylation-treated silica sol was condensed to the $SiO_2$ concentration of about 30% by weight by vacuum distillation under a pressure of 120 Torr (0.015 MPa). Vacuum distillation was continued under a pressure of 120 Torr (0.015 MPa) while adding 420 g of n-butyl acetate such that the $SiO_2$ concentration in the sol was almost constant to obtain a butyl acetate-dispersed hydrophobic organosilica sol ($SiO_2$ concentration: 30% by weight; specific gravity: 1.077; viscosity: 1.47 mPa.s; water content: 0.2% by weight; methanol concentration: 0.8% by weight). This butyl acetate-dispersed hydrophobic organosilica sol was diluted with butyl acetate such that the SiO2 concentration was 20% by weight, and the viscosity thereof was measured. As a result, the viscosity at 20° C. was 0.90 mPa.s, and the specific viscosity to the solvent was 1.2

The present invention is a process of producing a hydrophilic organosilica sol which comprises conducting a silylation treatment of a surface of a hydrophobic colloidal silica by aging a reaction mixture at 0 to 100° C. in the state that an alkali present in the reaction mixture is removed or is neutralized with an acid in an equivalent amount or more, the reaction mixture containing the hydrophilic colloidal silica, a silylating agent of a disiloxane compound and/or monoalkoxysilane compound in a millimolar ratio of 0.05 to 2 in terms of Si atom per 100 m² of a surface of the hydrophilic colloidal silica, a medium as a residue thereof comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium. Further, the hydrophobic organosilica sol containing silica of SiO₂ concentration of 20% by weight is a low viscosity hydrophobic organosilica sol having a specific viscosity of 5 or less.

The present invention relates to a process of producing a hydrophobic organosilica sol in which a hydrophobic colloidal silica wherein a part of silanol groups on a surface of particles is silylation-treated is stably dispersed in an organic solvent. In particular, this process is suitable for the production of a hydrophobic organosilica sol having excellent stability, which is dispersed in a solvent which is difficult to mutually dissolve in water, such as ketones (e.g., methyl ethyl ketone, methylisobutyl ketone, cyclohexanone, etc.) or esters (e.g., ethyl acetate, butyl acetate, methyl methacrylate, etc.). According to the process of the present invention, an organosilica sol having excellent dispersibility and which does not contain by-products, such as an acid or an alkali, resulted from a silylating agent which impairs properties of the sol can efficiently be obtained. Further, the sol can be stabilized with an amount of silyl groups smaller than the conventional amount, and it is also possible to control a degree of hydrophobicity according to the purpose of use.

The organosilica sol obtained according to the process of the present invention has good dispersibility, low viscosity, excellent transparency and good compatibility with a resin solution. Therefore, it is particularly useful as a microfiller which imparts scratch resistance, adhesiveness, heat resistance and the like when it is added a coating agent, a paint binder.

What is claimed is:
1. A process of producing a hydrophobic organosilica sol which comprises aging a reaction mixture at 0 to 100° C. in the state that an alkali present in the reaction mixture is removed or is neutralized with an acid in an equivalent amount or more, thereby forming a silylation-treated silica sol having a hydrophobic colloidal silica dispersed therein, the reaction mixture comprising:
 a hydrophilic colloidal silica having a specific surface area of 5.5 to 550 m²/g in SiO₂ concentration of 5 to 55% by weight,
 a silylating agent of a disiloxane compound and/or monoalkoxysilane compound in a millimolar ratio of 0.03 to 2 in terms of Si atom per 100 m² of a surface of the hydrophilic colloidal silica, and
 a medium, as a residue thereof, comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium.

2. The process of producing a hydrophobic organosilica sol as claimed in claim 1, wherein the silylating agent is hexamethyl disiloxane.

3. The process of producing a hydrophobic organosilica sol as claimed in claim 1, wherein the silylating agent is at least one selected from the group consisting of trimethylmethoxysilane, trimethylethoxysilane and trimethylpropoxysilane.

4. A process of producing a hydrophobic organosilica sol which comprises the steps of:
 (A) aging a reaction mixture at 0 to 100° C. in the state that an alkali present in the reaction mixture is removed or is neutralized with an equivalent amount or more of an acid, to form a silylation-treated silica sol having a hydrophobic colloidal silica dispersed therein, said reaction mixture comprising:
  a hydrophilic colloidal silica having a specific surface area of 5.5 to 550 m²/g in SiO₂ concentration of 5 to 55% by weight,
  a silylating agent represented by the following formulae (I) and/or (II) in a millimolar ratio of 0.05 to 2 in terms of Si atom per 100 m² of a surface area of the hydrophilic colloidal silica,

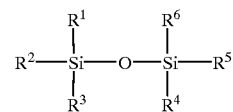

(I)

wherein R¹, R², R³, R⁴, R⁵ and R⁶ each independently represent one substituent selected from the group consisting of alkyl groups having 1 to 20 carbon atoms and phenyl groups, which may optionally be substituted;

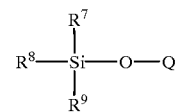

(II)

wherein R⁷, R⁸ and R⁹ each independently represent one substituent selected from the group consisting of alkyl groups having 1 to 20 carbon atoms and phenyl groups, which may be optionally substituted, and Q represents one substituent selected from the group consisting of alkyl groups having 1 to 3 carbon atoms, which may be substituted, and
  a medium comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium, and
 (B) distilling the silylation-treated silica sol produced in step (A) above to produce the hydrophobic organosilica sol wherein a medium of the silylation-treated silica sol is substituted with the hydrophobic organic solvent.

5. The process of producing a hydrophobic organosilica sol as claimed in claim 4, wherein the silylating agent is hexamethyl disiloxane.

6. The process of producing a hydrophobic organosilica sol as claimed in claim 4, wherein the silylating agent is at least one selected from the group consisting of trimethylmethoxysilane, trimethylethoxysilane and trimethylpropoxysilane.

7. A process of producing a hydrophobic organosilica sol which comprises the steps of:
(A) aging a first reaction mixture at 0 to 100° C. in the state that an alkali present in the reaction mixture is removed or is neutralized with an equivalent amount or more of an acid, to produce a silylation-pretreated silica sol having a hydrophobic colloidal silica dispersed therein, said reaction mixture comprising:
a hydrophilic colloidal silica having a specific surface area of 5.5 to 550 m²/g in SiO$_2$ concentration of 5 to 55% by weight,
a silylating agent represented by the following formulae (I) and/or (II) in a millimolar ratio of 0.03 to 1.5 in terms of Si atom per 100 m² of a surface area of the hydrophilic colloidal silica,

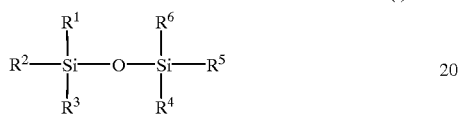

wherein R$^1$, R$^2$, R$^3$, R$^4$, R$^5$ and R$^6$ each independently represent one substituent selected from the group consisting of alkyl groups having 1 to 20 carbon atoms and phenyl groups, which may optionally be substituted,

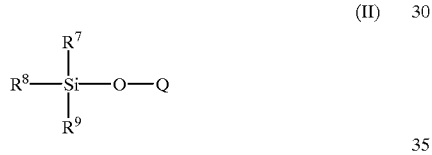

wherein R$^7$, R$^8$, and R$^9$ each independently represent one substituent selected from the group consisting of alkyl groups having 1 to 20 carbon atoms and phenyl groups, which may be optionally substituted, and Q represents one substituent selected from the group consisting of alkyl groups having 1 to 3 carbon atoms, which may be substituted, and
a medium, as a residue thereof, comprising a mixed solvent comprising a hydrophobic organic solvent having a solubility of water of 0.1 to 12% by weight and an alcohol having 1 to 3 carbon atoms in a weight ratio of 0.05 to 20 to the hydrophobic organic solvent, and water in an amount of 15% by weight or less based on the weight of the medium, (B) distilling the silylation-pretreated silica sol produced in step (A) above to produce an alcohol-containing hydrophobic organosilica sol wherein a medium of the silylation-pretreated silica sol is substituted with the hydrophobic organic solvent until the alcohol having 1 to 3 carbon atoms is a weight ratio of 0.05 to 5 to the hydrophobic organic solvent having a solubility of water of 0.1 to 12% weight, (C) aging a second reaction mixture at 0 to 100° C. to produce a silylation-treated silica-sol having the hydrophobic colloidal silica dispersed therein, said reaction mixture comprising:
the alcohol-containing hydrophobic organosilica sol produced in step (B),
the silylating agent represented by the above formulae (I) and/or (II) in the total addition amount in step (A) and step (C) of a millimolar ratio of 0.05 to 2 in terms of Si atom per 100 m² of a surface area of a hydrophilic colloidal silica which is a raw material of the hydrophobic colloidal silica in the alcohol-containing hydrophobic organosilica sol, and
a medium, as a residue thereof, comprising a mixed solvent comprising a hydrophobic organic solvent having a solubility in water of 0.1 to 12% by weight and an alcohol having 1 to 3 carbon atoms in a weight ratio of 0.05 to 20 to the hydrophobic organic solvent, and water in an amount of 15% by weight or less based on the weight of the medium, (D) distilling the silylation-treated silica sol produced in step (C) above to produce the hydrophobic organosilica sol wherein a medium of the silylation-treated silica sol is substituted with the hydrophobic organic solvent.

8. The process of producuing a hydrophobic organosilica sol as claimed in claim 7, wherein the silylating agent is hexamethyl disiloxane.

9. The process of producuing a hydrophobic organosilica sol as claimed in claim 7, wherein the silylating agent is at least one selected from the group consisting of trimethylmethoxysilane, trimethylethoxysilane, and trimethylpropoxysilane,

* * * * *

UNITED STATES PATENT AND TRADEMARK OFFICE
CERTIFICATE OF CORRECTION

PATENT NO.    : 6,025,455
DATED         : February 15, 2000
INVENTOR(S)   : Keiko Yoshitake and Takafumi Yokoyama It is certified that error appears in the above-identified patent and that said Letters Patent is hereby corrected as shown below:

Title page,
Item [73], Assignee, please change "Chemicals" to -- Chemical --.

Signed and Sealed this

Third Day of December, 2002

JAMES E. ROGAN
*Director of the United States Patent and Trademark Office*